United States Patent [19]

Queisser et al.

[11] 3,930,234

[45] Dec. 30, 1975

[54] METHOD AND APPARATUS FOR INSERTING ADDITIONAL DATA BETWEEN DATA PREVIOUSLY STORED IN A STORE

[75] Inventors: Rudolf Queisser, Geretsried; Hubert Schlossbauer, Krailling, both of Germany

[73] Assignee: Siemens Aktiengesellschaft, Berlin & Munich, Germany

[22] Filed: July 11, 1974

[21] Appl. No.: 487,554

[30] Foreign Application Priority Data

July 18, 1973 Germany .......................... 2336618

[52] U.S. Cl. ........................ 340/172.5; 340/146.1 R

[51] Int. Cl.² .................... G11B 27/00; G06F 11/00

[58] Field of Search...340/172.5, 146.1 R, 146.1 BA, 340/146.1 F; 360/57, 74

[56] References Cited

UNITED STATES PATENTS

| | | | |
|---|---|---|---|
| 3,273,120 | 9/1966 | Dustin et al. | 340/146.1 BA |
| 3,310,787 | 3/1967 | Welsh et al. | 340/146.1 BA |
| 3,665,413 | 5/1972 | Walsh et al. | 340/172.5 |
| 3,704,452 | 11/1972 | Beausoleil et al. | 340/172.5 |
| 3,766,529 | 10/1973 | McLaughlin | 340/172.5 |
| 3,771,125 | 11/1973 | Nagahori et al. | 340/146.1 BA |
| 3,821,703 | 6/1974 | Devore et al. | 340/146.1 AL |

*Primary Examiner*—Charles E. Atkinson
*Attorney, Agent, or Firm*—Hill, Gross, Simpson, Van Santen, Steadman, Chiara & Simpson

[57] ABSTRACT

A method and apparatus for inserting additional data between items of data stored in a store, in which the data is in the form of blocks of uniform block length, by the insertion of additional items of data which are to be inserted, as an additional block of equal block length, following a $(n-1)^{th}$ block, in which a first storage of the $(n)^{th}$ block of the store is effected, the additional block inserted in the store in place of the $(n)^{th}$ block, transferring the $(n)^{th}$ block from the first storage thereof and effecting a second storage thereof, subsequently transferring all the following blocks individually from the store into the first storage and, following each such first storage, inserting the block contained in the second storage into the store, and transferring, in each case, the block contained in the first storage into the second storage thereof.

7 Claims, 6 Drawing Figures

METHOD AND APPARATUS FOR INSERTING ADDITIONAL DATA BETWEEN DATA PREVIOUSLY STORED IN A STORE

BACKGROUND OF THE INVENTION

The invention is directed to a method and apparatus for inserting additional data to those previously stored in a store in the form of blocks of uniform block length, in which the additional items of data must be inserted, as an additional block of the same block length, following its ($n-1$)th block.

When items of data are stored in the form of respective blocks, it frequently is not possible to address individual items of data within a block and if such items of data are faulty or must be exchanged for new items of data, it consequently becomes necessary to exchange complete blocks.

For example, data is usually recorded in serial fashion on a magnetic tape in the form of blocks, with the blocks being separated from one another by block gaps, the minimum length of which is determined by the distances which the magnetic tape travels while it is being accelerated up to a normal speed or while it is again coming to a halt. As such distances usually fluctuate about a theoretical value, it is not possible, when the magnetic tape has a large storage density, to effect with a reasonable technical outlay the location of individual items of data within a block. Therefore, it is necessary, for the addition of data, to replace an entire block.

A method is already known (German OS No. 1,940,029) by means of which blocks stored on a magnetic tape can be corrected by exchanging such blocks when, with a manual input of data, the items of data recorded on the magnetic tape do not agree with the input items of data. The items of corrected data are supplied in the form of a correction block which is recorded on the magnetic tape in place of the original block.

However, if it is not possible to accommodate the items of additional data in a single block, only the first correction block can be stored, i.e., substituted for the original block in accordance with such known process, as otherwise other blocks which are already stored would be destroyed. Consequently the known method neither provides for, nor is suitable for storing the remainder of the additional blocks, or for inserting additional blocks between previously stored blocks, nor is any other process known by means of which such a correction of items of stored data can be effected.

BRIEF SUMMARY OF THE INVENTION

The invention therefore has among its objects to provide a method and arrangement in which items of data stored in serial fashion in the form of blocks in a suitable store may be provided with additional blocks which are subsequently inserted between the original blocks thereof.

In accordance with the invention, this objective is achieved by reading the ($n$) th block out of the store and inserting it into a first register and subsequently inserting the correction block into the store in place of the ($n$) th block read out therefrom. The ($n$) th block is subsequently transferred from the first register to a second register, with all following blocks being subsequently read out individually from the store and inserted into the first register, and that following each such readout of a block, the block in each case contained in the second register is re-entered into the store, and the block in each case contained in the first register is transferred to the second register. The method of the invention has the advantage that for the insertion of additional blocks between previously stored blocks, apart from the two registers, no other stores are required for the data. Also, the invention has an advantage that the insertion of a block in place of the previously stored block takes place automatically. By duplicating the operation several times it is possible to consecutively insert as many additional blocks as permitted by the storage capacity of the storage medium. In the event the store is in the form of a magnetic tape, in which the blocks are recorded on the magnetic tape and separated from one another by block gaps, it is advantageous to provide that subsequent to each read-out of a block, the magnetic tape is reset by the length of such block and is then newly recorded thereupon.

In the event the method is employed in a magnetic tape store operating with characters, and individual characters are to be subsequently inserted, it is advantageous if the blocks each consist of one character.

Apparatus for the practice of the method requires merely a low outlay if a first register is provided which is connected to a read-out circuit of the store and which stores the read-out blocks, with a second register being provided which is selectively supplied, over a first input, with the additional block and, over a second input, with the contents of the first register, with the output of the second register being operatively connected to a write-in circuit of the store. In such case a control circuit may be provided which is connected to the two registers and a write-in read-out control unit of the store, which controls successively the read-out of a block, write-in of a block and transfer of a block from the first to the second register.

BRIEF DESCRIPTION OF THE DRAWINGS

In the drawings wherein like reference characters indicate like or corresponding parts, FIG. 1 schematically illustrates a plurality of blocks recorded on a magnetic tape and a correction block which is to be inserted thereon.

DETAILED DESCRIPTION OF THE INVENTION

Figure 1:
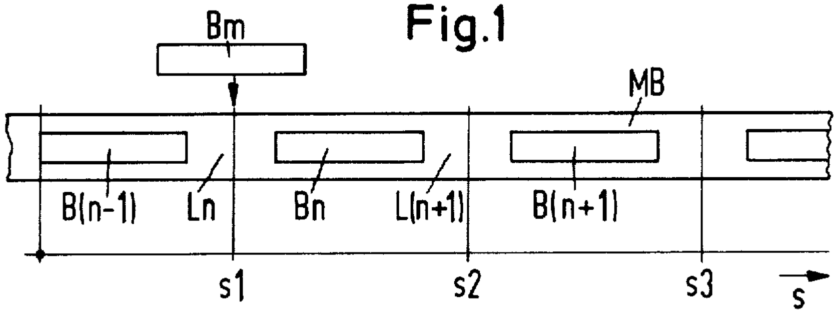

Referring to the drawings and more particularly to FIG. 1, the latter schematically illustrates a plurality of data blocks, B ($n-1$) to B ($n+1$) which are recorded in the longitudinal direction of a magnetic tape MB. As indicated, the direction of the abscissa represents the path or travel $s$ over which the magnetic tape MB travels relative to a magnetic head. All of the blocks possess the same block length which, for example, may correspond to the length of one line of a high-speed printer or teleprinter. The blocks are separated from one another by respective block gaps L$n$ and L ($n+1$), the length of which is determined by the mechanical characteristics of the magnetic tape device. It is assumed in the disclosure of FIG. 1 that an additional block B$m$ is to be subsequently inserted between the blocks B ($n$ − 1) and B$n$ which are stored on the magnetic tape MB, whereby the blocks, following insertion of the correction block BM, will be recorded on the magnetic tape.

Figures 2, 3:
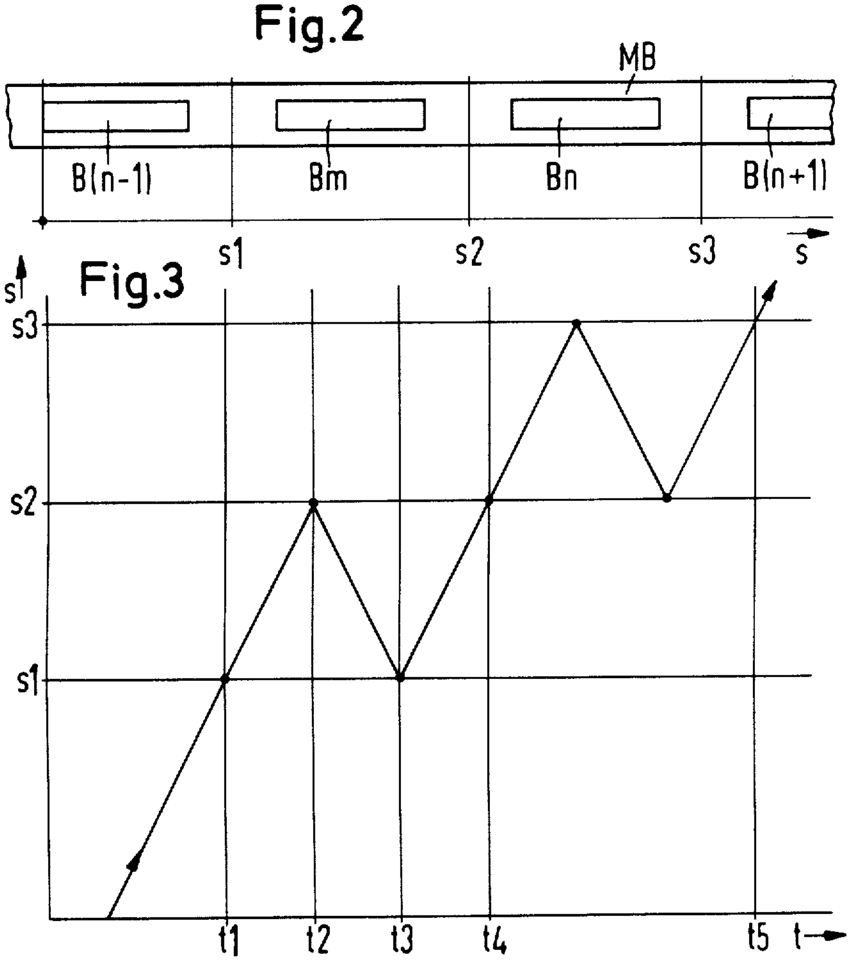
FIG. 2 is a similar figure schematically illustrating a plurality of recorded blocks on a magnetic tape following the insertion of a correction block.
FIG. 3 is a travel-time diagram of a tape store.

The travel of the magnetic tape MB in dependence upon time is schematically illustrated in FIG. 3 in which the time $t$ is depicted on the abscissa and the travel $s$ of the magnetic tape is depicted in the ordinate direction. The travel-timed diagram will be described in detail in connection with the block circuit diagram illustrated in FIG. 4.

Figure 4:
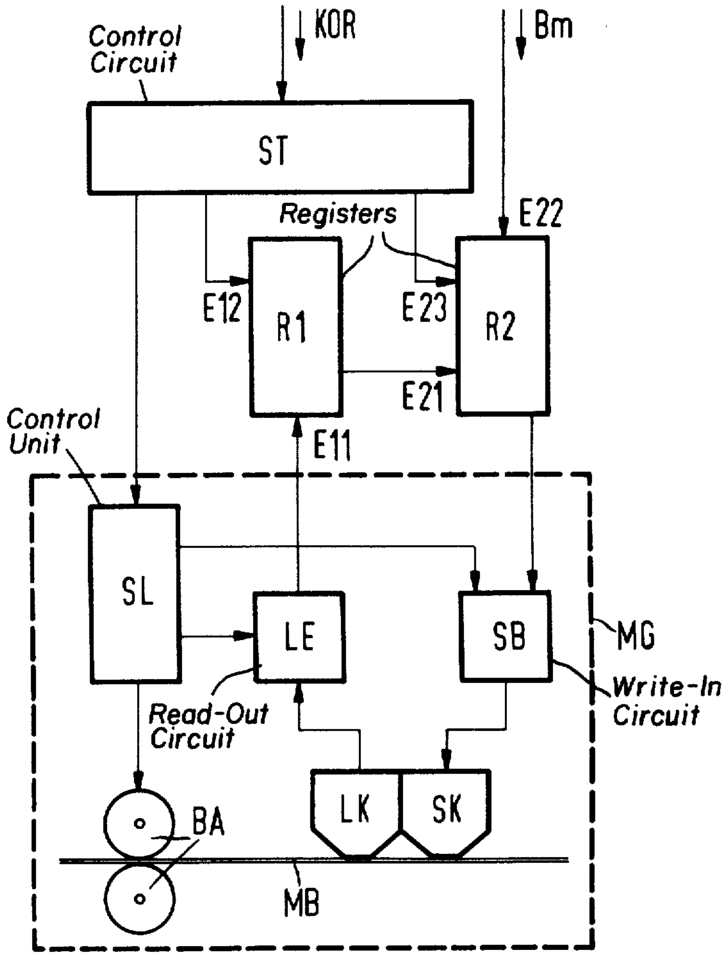
FIG. 4 is a circuit diagram, in block form, of an apparatus for practicing the method.

FIG. 4 illustrates a circuit arrangement for practicing the invention and employs a first register R1, a second register R2 and a control circuit ST. The registers R1 and R2 are adapted to intermediately store blocks and thus possess as many storage positions in each register as required to accommodate a complete block, with the control circuit ST controlling the time sequence of the operations and containing logic elements and flip-flops.

A first input E11 of the register R1 is connected to the output of a read-out circuit LE of the magnetic tape device MG, which in known manner supplies the data read out in a digital form over a read-out head LK from the magnetic tape MB. The output of the register R1 is connected to a first input E21 of the register R2, and additional block BM is adapted to be supplied to the register R2 over a second input E22. The output of the register is connected. to a write-in circuit SB of the magnetic tape device MG, by means of which the data at the input may, in known manner over a write-in head SK, be recorded on the magnetic tape MB. It may be, for example, assumed that the write-in head SK and the read-out head LK are constructed as a common magnetic head or, since the write-in and read-out operations alternate, a combined write-in read-out head may be employed.

The control circuit ST is connected to a write-in read-out control unit SL of the magnetic tape device MG which, in known manner, effects a write-in operation, a read-out operation, or commands for control of the movement of the magnetic tape of the device MG. To effect such control, the write-in, read-out control unit SL is operatively connected to the write-in circuit SB, the read-out circuit LE and the tape drive means BA of the magnetic tape device MG. The control circuit ST is also connected to respective inputs E12 and E23 of the registers R1 and R2, by means of which the write-in operations into the respective registers is controlled.

It will be assumed in FIG. 3 that at the time $t1$, the magnetic tape extends over the magnetic head with the position $s1$, representing the center of the block gap L$n$ between the blocks B (1−) and B$n$, operatively centered over the head.

The additional block Bm to be inserted on the magnetic tape MB following the ($n$ − 1) th block, is supplied at the input 22 of the register R2. Following depression of a add key, a signal KOR is transmitted to the control circuit ST, as a result of which signal the control circuit supplies a signal to the input E23 of the register R2 to effect a write-in of additional block B$n$ into such register. The control circuit ST then supplies to the write-in, read-out control unit SL of the magnetic tape device MG, a read-out command which causes a read-out of the block BN from the magnetic tape MB, with such block being read-out over the read-out head LK and the read-out circuit LE, from which it is supplied, in response to a further signal from the control circuit ST, to the input E12 of the register R1.

If the control circuit ST has recognized the end of the block BN, for example as a result of a counting off of the data involved, at the time $t2$, the magnetic tape MB is brought to a halt in the tape position S2 i.e., in the center of the block gap L ($n$ − 1). The control circuit ST then supplies a resetting signal to the write-in, read-out control unit SL and such signal is operative, over the tape drive device BA, to reset the magnetic tape MB by the length of the previously read-out block. The magnetic tape is thus returned and comes to a halt at the time $t3$, with the center of the block gap L$n$ at the tape position S1.

The control circuit ST thereafter supplies a write-in signal to the write-in, read-out control unit SL whereby the correction block Bm contained in the register 2 is read-out over the write-in circuit SB and the write-in head SK, and thereby recorded on the magnetic tape MB in place of the previously read-out block B$n$. Following the write-in of the block B$m$ the magnetic tape MB is again stopped and at the time T4 the tape position S2 again is disposed at the magnetic head.

The control circuit ST supplies to the register R2 a further pulse which now effects a read-out of the block B$n$ from the register R1 into the register R2 in place of the additional block BM originally stored therein. The next block B ($n$ + 1) is subsequently read-out of magnetic tape MB and entered into the register R1, the magnetic tape MB again reset by one block and thereafter the block BM contained in the register R2 is recorded thereupon. At the time $t5$ the tape position s3 is disposed above the magnetic head and the blocks B ($n$ − 1), B$m$ and B$n$ are recorded upon the magnetic tape in the manner illustrated in FIG. 2.

The read-out, resetting and write-in processes are automatically repeated until the last block is again recorded upon the magnetic tape.

If a plurality of additional blocks are to be inserted between previously recorded blocks, the described steps are effected several times, assuming, of course, that sufficient storage space is available on the magnetic tape to accommodate the additional blocks.

Figure 5:
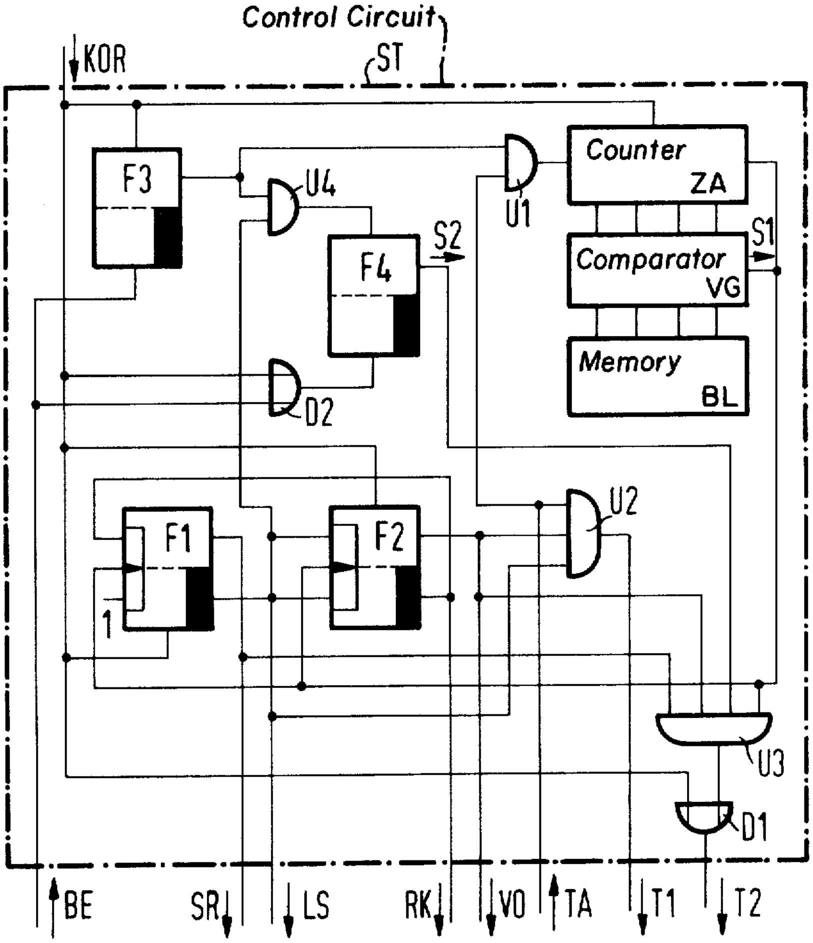
FIG. 5 is a circuit diagram of the control circuit, illustrated in block form, in FIG. 4.

FIG. 5 illustrates details of the controller ST of FIG. 4. The controller illustrated comprises four flip-flops F1 to F4, four AND-gate U1 to U4 and two Or-gate D1 and D2. In addition it contains a counter ZA, a comparator VG and a memory BL, in which the block-length is stored. A signed KOR is supplied to the controller ST by means of a suitable correction-key or the like and is supplied from the magnetic tape device MG, with a signal BE, which indicates the end of the tape, and a signal TA which indicates the writing- and reading-rate or cycle. The controller ST imparts to the register R1 or R2, respectively, take-over impulses T1 or T2, respectively, and in addition it controls, through further signals LS, SR, RK and VO the magnetic tape device MG. Further details of the controller ST shown in FIG. 5 will be described in connection with the time-diagrams shown in FIG. 6.

Figure 6:
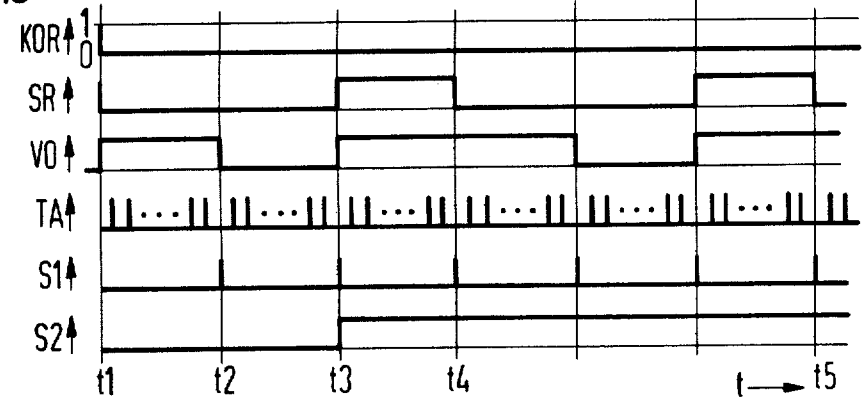
FIG. 6 is a time chart illustrating different conditions at points of the control circuit, with respect to time.

FIG. 6 illustrates time diagrams of the respective signals, as they occur during operation of the circuit arrangement illustrated in FIG. 5, in which the abscissae represents the time $t$ and the ordinate represents the amplitudes of the signals. As the signals are exclusively binary signals, they may assume solely the binary values represented by 0 or 1.

At the time point $t1$, the additional of the blocks commences and the signal KOR for a short time assumes the binary value 1. A take-over impulse T2 is supplied from the OR-member D1 to the input E23 of the register R2 and the additional-block B$m$ is entered in the register R2.

The signal KOR additionally resets the flip-flops F2 and F3 and resets the flip-flops F1 and F4 and the counter ZA. The signal SR at the output of the flip-flops F1 has the binary value 0, while the signal LS at the inverted output of the flip-flops F1 assumes the binary value 1, and thereupon a reading-command is supplied to the magnetic tape device MG. The signal VO at the output of the flip-flop F2 likewise assumes the binary value 1, and indicates to the magnetic tape device MG, that the magnetic tape MB is to be moved in forward direction.

With the movement of the magnetic tape, the first block Bn is read, and during the reading, reading rates or cycles are given off by the magnetic tape device MG which rates or cycles are conveyed as cycles TA on the one hand through the AND-gate U1 to the counter ZA and on the other hand, through the AND-gate U2 as takeover impulses T1 to the input E12 of the register R1. At the same time, the data signals of the block B$n$ just read are conveyed to and stored in the register R1 by means of the take-over impulses T1. With each data signal is correlated a reading-cycle-impulse, with the counter ZA counting the number of the reading cycles. The output of the counter ZA is connected with the comparator VG which compares the counting result with a block length, for example stored in the memory BL.

If the entire block B$n$ is read at the point of time $t2$, the comparator VG transmits a signal S1, which resets the counter ZA to the counting condition 0 and at the same time applies a signal to the cycle-inputs of the flip-flops F1 and F2 and on the AND-gate U3.

The flip-flop F2 is reset by the signal S1 and the signal VO assumes the binary value 0, while the condition of the flip-flop F1 remains unaltered. At the same time, the signal RK assumes the binary value 1 and indicates to the magnetic tape device MG that it is to travel in rearward direction.

The magnetic tape MB thus is moved in rearward direction and the block B$n$ is read in rearward direction. Again reading cycles are imparted to the counter ZA, as signals TA.

At the time point $t3$, the reading of the block B$n$ is terminated and the comparator VG transmits a signal S1, by means of which the flip-flops F1 and F2 are set. The signal LS assumes the binary value 0 and at the inverted output of the flip-flop F1, the signal SR assumes the binary value 1. Through such signal SR a writing command is transmitted to the magnetic tape device MG. In addition, through the AND-gate U4 the flip-flop F4 is set and the signal S2 assumes at its output the binary value 1. At the same time, the signal VO assumes the binary value 1 and the magnetic tape device MG begins to write in the additional block B$m$, standing in the register R2, on the magnetic tape MB.

The writing cycle is produced in the magnetic tape device MG and imparted for example through an OR-gate in the writing-reading control unit SL, as signal TA, to the controller ST. The counter ZA counts the writing cycles and the comparator VG, after the writing of the complete block B$m$ at the point of time $t4$, again transmits a signal S1.

At the point of time $t4$, the flip-flop F1 and the counter ZA are reset by means of the signal S1. At the same time, through the AND-gate U3 and the OR-gate D1 a take-over impulse T2 is transmitted to the register R2, which receives the block B$n$ from the register R1. In similar manner, as between the points of time $t1$ and $t2$, subsequently the block B ($n+1$) is read off from the magnetic tape MB and stored in the register R1. Thereafter, the magnetic tape MB is again read in rearward direction in the same manner as between the time points $t2$ and $t3$, and subsequently the block B$n$ is recorded on the magnetic tape MB in the same manner as between the fine points $t3$ and $t4$.

At the point of time $t5$, the writing of the block B$n$ is terminated and the block B ($n+1$) is transferred from the register R1 to the register R2. Subsequently the next block B ($n+2$) is read from the magnetic tape into the register R1.

This procedure is repeated until the magnetic tape MG, for example through a photoelectric scanning, an end-of-tape mark on the magnetic tape MB is ascertained. In this case, the addition is terminated. The magnetic tape device MG imparts the signal BE, which resets the flip-flops F3 and F4 and thereupon both blocks off the transmittal of take-over impulses T2 as well as the counting of further cycles TA through the AND-gate U1. As the comparator accordingly no longer transmits signals S2, the conditions of the flip-flops F1 and F2 do not change and the controller ST thus transmits no further commands to the magnetic tape device MG.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. A method for the insertion of additional data, in data previously stored in a store in the form of blocks of given block lengths, in which the additional data is likewise in the form of a block of given block length, whereby such additional block is to be inserted following an $(n-1)^{th}$ block, comprising the steps of reading out the $n^{th}$ block from such store into a first register, writing said additional block into the store in lieu of the $n^{th}$ block removed therefrom, transferring said $n^{th}$ block from the first register into a second register, and then successively entering the subsequent originally stored blocks, into the first register, writing the block in the second register into the store in lieu of the last block removed therefrom, and transferring the block in the first register into the second register.

2. A method according to claim 1, wherein a block comprises one character.

3. A method according to claim 1, wherein the store is in the form of a magnetic tape store, in which the blocks are recorded on a magnetic tape and separated from one another by block gaps, comprising the additional step of resetting the magnetic tape, following each read-out of a block therefrom, by the length of such read-out block, and effecting the recording thereon of a block from said second register.

4. A method according to claim 3, wherein a block comprises one character.

5. An arrangement for the insertion of additional data in data previously stored in a store, in the form of blocks of uniform block length, by insertion of the additional data in the form of an additional block of like block length, following a $(n-1)^{th}$ block, comprising a store having a read-out circuit and a write-in circuit, a write-in read-out control unit connected to said circuits for controlling the entry and withdrawal of data from said store, a first register connected to said read-out circuit for receiving and storing data from said store, a second register connected to said first register for receiving and storing data from the latter and having an input to which additional blocks may be supplied, said second register being connected to said write-in circuit for supplying its storage content thereto, and a control circuit connected to said registers and to said write-in read-out control unit, for controlling the entry of data into said first register, transfer of data from said first to said second register, and transfer of data from said second register to said store.

6. An arrangement according to claim 5, wherein said store is a magnetic tape store in which the blocks are recorded upon a magnetic tape separated from one another by block gaps, and means for controlling the movement of said tape, said write-in read-out control unit being connected to said tape control means for controlling the operation of the latter.

7. An arrangement according to claim 5, wherein said control circuit comprises a counter for counting the length of one block, means for storing the value representing the length of one block, a comparator operatively connected to said counter and storage means operative to supply a signal indicating the counting off of the length of one block, and means comprising a plurality of gates and flip-flops operatively connected to said counter, said registers and said write-in read-out control unit for selectively controlling the latter in response to a signal from said comparator indicating in each case the termination of the block involved.

* * * * *